(12) United States Patent
Takei

(10) Patent No.: US 7,548,366 B2
(45) Date of Patent: Jun. 16, 2009

(54) ELECTROPHORETIC DISPLAY MODULE AND ELECTROPHORETIC DISPLAY DEVICE

(75) Inventor: Yoshiki Takei, Matsumoto (JP)

(73) Assignee: Seiko Epson Corporation (JP)

( * ) Notice: Subject to any disclaimer, the term of this patent is extended or adjusted under 35 U.S.C. 154(b) by 135 days.

(21) Appl. No.: 11/468,446

(22) Filed: Aug. 30, 2006

(65) Prior Publication Data

US 2007/0103429 A1    May 10, 2007

(30) Foreign Application Priority Data

Nov. 10, 2005    (JP) .............................. 2005-326631

(51) Int. Cl.
*G02F 26/00* (2006.01)
(52) U.S. Cl. ..................................... 359/296
(58) Field of Classification Search ................ 359/296; 361/600, 681, 682; 235/488; 349/56, 58
See application file for complete search history.

(56) References Cited

U.S. PATENT DOCUMENTS 6,655,788 B1 * 12/2003 Freeman ...................... 347/58
6,909,532 B2 * 6/2005 Chung et al. ................ 359/296

FOREIGN PATENT DOCUMENTS

JP    2003-270674    9/2003

* cited by examiner

*Primary Examiner*—Hung X Dang
*Assistant Examiner*—Tuyen Q Tra
(74) *Attorney, Agent, or Firm*—Harness, Dickey & Pierce, P.L.C.

(57) ABSTRACT

An electrophoretic display (EPD) module includes an EPD laminate, conductive portions made of ITO layers which are located at both ends of the EPD laminate, a casing that encloses the EPD laminate, and retentive portions that are provided in the casing and retain the EPD laminate, in which the retentive portions contact and retain at least a part of the conductive portions to position the EPD laminate with respect to the casing.

6 Claims, 2 Drawing Sheets

ELECTROPHORETIC DISPLAY MODULE AND ELECTROPHORETIC DISPLAY DEVICE

BACKGROUND

1. Technical Field

The present invention relates to an electrophoretic display module that employs an electrophoresis phenomenon, in which charged particles are moved by an applied voltage, for forming images, or an electrophoretic display device that employs the electrophoretic display module, and more particularly, to an electrophoretic display module having a specific structure, in which an electrophoretic laminate is fixed to a casing, and an electrophoretic display device that employs the electrophoretic display module.

2. Related Art

An electrophoretic display (EPD) device includes an electrophoretic laminate that employs an electrophoresis phenomenon in which particles dispersed in a solvent are moved by an applied voltage. The EPD may employ a microcapsule type electrophoretic method, a horizontal movement type electrophoretic method, a vertical movement type electrophoretic method or the like. The EPD device can be easily fabricated or treated as compared with a liquid crystal display (LCD) device. When the EPD device is bent, an image display quality is less influenced. Accordingly, the EPD devices are expected to be used for wrist watches, electronic devices, and operation display devices having curved exterior surfaces.

For example, an EPD device includes first and second substrates spaced apart at a predetermined interval for preventing barrier ribs from breaking when the EPD device is bent and barrier ribs located around a pixel for maintaining the interval, in which the contact area between the barrier ribs and the second substrate is larger than that between the barrier ribs and the first substrate (see JP-A-2003-270674).

In the past, when the EPD laminate is fixed to a casing, since the EPD laminate is positioned and retained on the surface of the EPD unit on which EPD is performed, the positioning structure contacts the surface of the FPD unit, and a stress is applied to the contact portion to deteriorate the image display quality and reduce reliability of a sealing portion.

In addition, when the EPD laminate is bent and fixed to the casing, stress is locally applied to the EPD laminate due to its own elasticity, and as a result, the image display quality or electrical characteristics deteriorate.

SUMMARY

An advantage of some aspects of the invention is to provide an electrophoretic display (EPD) module that does not apply a stress on an EPD laminate when the EPD laminate is fixed to a casing and has high display quality and electrical characteristics by improving reliability of a sealing portion and an EPD device that employs the EPD module.

According to an aspect of the invention, there is provided an EPD module including an EPD laminate, conductive portions made of indium tin oxide (ITO) layers located at both ends of the EPD laminate, a casing that encloses the EPD laminate, and retentive portions that are provided in the casing and retain the EPD laminate. The retentive portions contact and retain at least a part of the conductive portions to position the EPD laminate with respect to the casing.

In the above aspect of the invention, the conductive portions include notch portions formed by notching parts of the conductive portions, and the retentive portions contact and retain the notch portions to position the EPD laminate with respect to the casing.

According to another aspect of the invention, there is provided an EPD device that employs the aforementioned EPD module.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
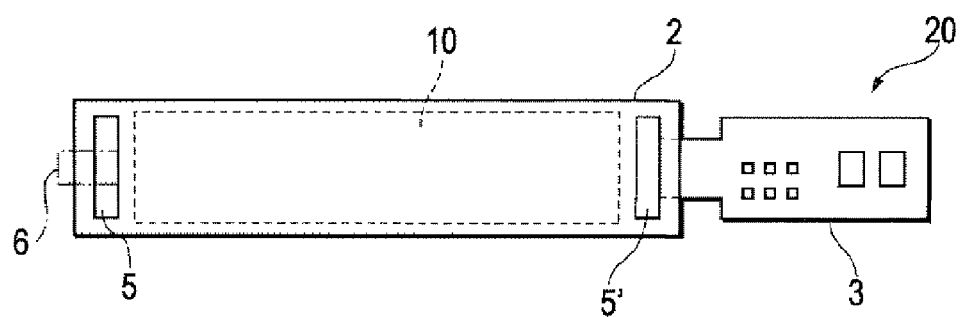
FIG. 1 is a top plan view of a wrist watch used for an electrophoretic display (EPD) module according to a first embodiment.

Hereinafter, embodiments of the invention will be described. The following embodiments should be considered in descriptive sense only and not for purposes of limitation. Various changes in form and details may be made without departing from the spirit and scope of the invention.

An electrophoretic display (EPD) module includes an EPD laminate (or briefly referred to as laminate), conductive portions made of ITO layers which are located at both ends of the EPD laminate, a casing enclosing the EPD laminate, and retentive portions that are provided in the casing and retain the EPD laminate. The retentive portions contact and retain at least a part of the conductive portions to position the EPD laminate with respect to the casing.

According to the aforementioned structure, when the laminate is fixed to the casing, a stress is not applied to the laminate, and reliability of a sealing portion is improved so as to obtain the EPD module having high display quality and electrical characteristics.

That is, since the EPD module employs a structure in which the laminate includes the conductive portions at the both ends of the laminate, and the retentive portions retain not an EPD unit but the conductive portions to position the laminate with respect to the casing, a stress is not directly applied to a display surface of the EPD module. Accordingly, display anomaly is prevented, and the reliability of a sealing portion is improved.

In the aforementioned structure, the laminate can be positioned with respect to the casing in three directions, that is, one direction (perpendicular direction; z direction) perpendicular to an EPD plane and two EPD plane directions (parallel directions; x and y directions).

In case that the casing has curved surfaces, when the laminate is bent and fixed to the casing or left in the casing, the retentive portion retains the conductive portions, and therefore a local stress due to elasticity of the laminate is applied to the conductive portions. Accordingly, the retentive portions do not directly contact the EPD plane, and the stress is not directly applied to the EPD plane.

In a structure in which the conductive portions made of ITO layers are located at positions that are hidden by the casing, the laminate is fixed to the casing without breaking exteriors.

Since the conductive portions are located at both ends of the laminate and located at different positions from the EPD unit, it is easy that the conductive portions are designed in a circumferential shape suitable for positioning or fixing.

The ITO layer denotes an indium tin oxide layer. When transparent electrodes are used, another material may be used.

The casing may be a case or container enclosing a part of or entire laminate.

The retentive portions contact and retain at least a part of the conductive portions, which means that the retentive portions may contact and retain one conductive portion or both conductive portions. When the retentive portions contact and retain the single conductive portion, the retentive portions may contact and retain a part of or entire single conductive portion.

The conductive portions include notch portions formed by notching parts of the conductive portions, and the retentive portions contact and retain the notch portions to position the EPD laminate with respect to the casing.

The EPD device that employs the EPD module according to an embodiment of the invention can be applied to various electric devices that may have curved shapes. For example, the EPD device can be applied to electric devices such as wrist watches, electronic papers, electric bulletin boards, advertisement display panels, video cameras, televisions, large screens, mobile phones, personal computers, and personal digital assistants (PDA). A part of or entire EPD device may have curved shapes.

Hereinafter, the embodiments of the invention will be described with reference to the accompanying drawings.

First Embodiment

Figure 2:
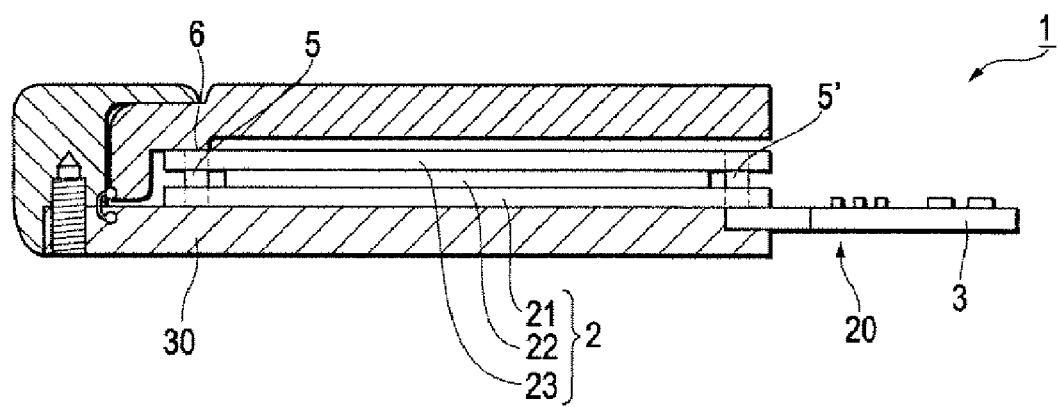
FIG. 2 is a side cross sectional view of the EPD module according to the first embodiment.

FIG. 1 is a top plan view of a wrist watch 20 used for an electrophoretic display (EPD) module according to the first embodiment. FIG. 2 is a side cross sectional view of the EPD module 1 in which the wrist watch 20 is mounted into a case 30.

As shown in FIG. 1, the wrist watch 20 includes an EPD laminate 2, conductive portions 5 and 5' made of ITO layers which are located at both ends of the laminate 2, and a driving circuit unit 3. The laminate 2 includes an EPD unit 10.

As shown in FIG. 2, the EPD module 1 includes the wrist watch 20, the case 30 that encloses the wrist watch 20, and a retentive portion 6 that is located in the case 30. The driving circuit unit 3 is fixed to the laminate 2 by adhering to the conductive portion 5'.

The EPD laminate 2 includes a semiconductor substrate 21, a transparent electrode substrate 23, an EPD layer 22 located between the semiconductor substrate 21 and the transparent electrode substrate 23, and a protection sheet (not shown) that encloses and seals the aforementioned elements. The laminate 2 has flexibility.

The semiconductor 21 includes a flexible rear substrate as an insulating lower substrate that forms a circuit and a thin semiconductor circuit layer.

The transparent electrode substrate 23 includes a transparent substrate, on the lower surface of which there is formed a transparent electrode layer. The transparent substrate is made of a transparent insulating synthetic resin such as polyethylene terephthalate (PET) or polyimide. The transparent electrode layer is made of, for example, a tin-doped indium oxide layer.

The EPD layer 22 is located between the semiconductor circuit layer and the transparent electrode layer. The EPD layer 22 includes a microcapsule that is made of a transparent resin and encloses an electrophoretic dispersion liquid. The electrophoretic dispersion liquid includes a transparent insulating liquid, positively charged white particles, and negatively charged black pigments. The electrophoretic particles move in an electrophoretic dispersion medium according to an applied voltage.

The aforementioned elements are coated and sealed by an anaerobic or waterproof protection sheet through an adhesive. The protection sheet is made of, for example, PET, methyl polymethacrylate, polycarbonate, or the like.

As shown in FIG. 2, when the wrist watch 20 is mounted in the case 30, the retentive portion 6 contacts and retains the conductive portion 5 to position and retain the laminate 2 in the case 30. As shown in FIG. 1 with a broken line, the retentive portion 6 contacts only the center portion of the conductive portion 5. The retentive portion 6 retains not the EPD unit 10 but the conductive portion 5 that is located at an end of the laminate 2.

Since the retentive portion 6 retains the conductive portion 5 and positions the laminate 2 with respect to the case 30, a stress is not applied to the surface of the EPD unit 10. Accordingly, display anomaly is prevented, and the reliability of a sealing portion is improved to obtain high display quality and electrical characteristics.

In the aforementioned structure, the laminate 2 can be positioned with respect to the case in three directions, that is, one direction (perpendicular direction; z direction) perpendicular to an EPD plane 10 and two EPD plane directions (parallel directions; x and y directions).

Second Embodiment

Figure 3:
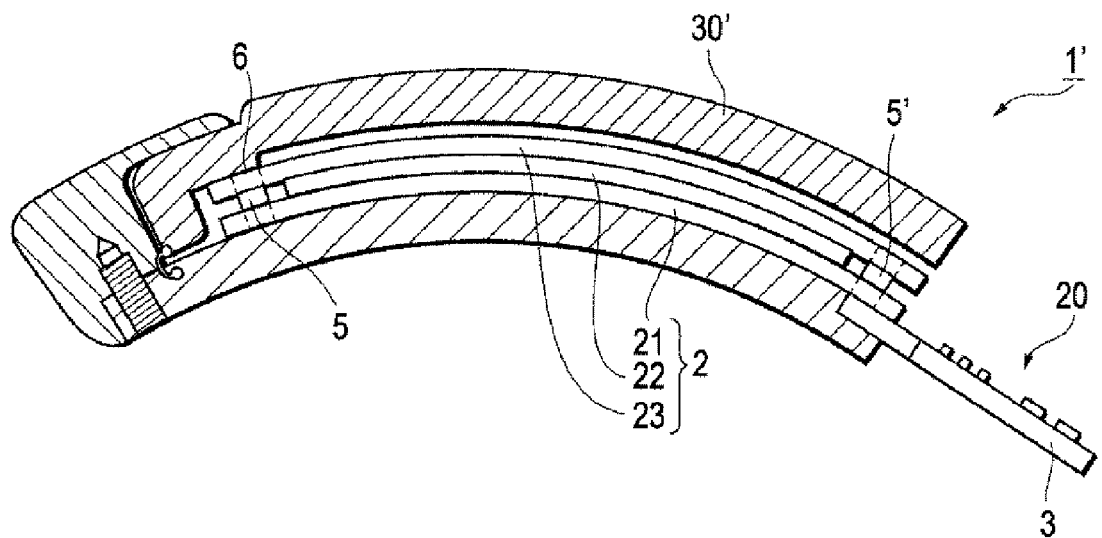
FIG. 3 is a side cross sectional view showing a structure in which a wrist watch is mounted in a casing that has curved surfaces according to a second embodiment.

FIG. 3 is a side cross sectional view of the EPD module in which the wrist watch 20 is mounted into a case 30' that has curved surfaces. Unlike the first embodiment, in the second embodiment, the case 30' has a curved shape. In FIG. 3, the same elements as the elements of FIG. 1 are indicated by the same reference numerals, and the duplicated descriptions about the elements will be omitted.

As shown in FIG. 3, when the wrist watch 20 is mounted into the case 30' that has the curved surfaces, the laminate 2 is incorporated in the case 30' along the curved surfaces, and the retentive portion 6 contacts and retains the conductive portion 5 to position the laminate 2 with respect to the case 30'

When the flexible laminate 2 is bent and mounted or fixed into the case 30', a local stress due to elasticity of the laminate 2 is applied not to the surface of the EPD unit, but to the conductive portion 5. Accordingly, display anomaly is prevented, and the reliability of a sealing portion is improved to obtain high display quality and electrical characteristics.

Third Embodiment

Figure 4:
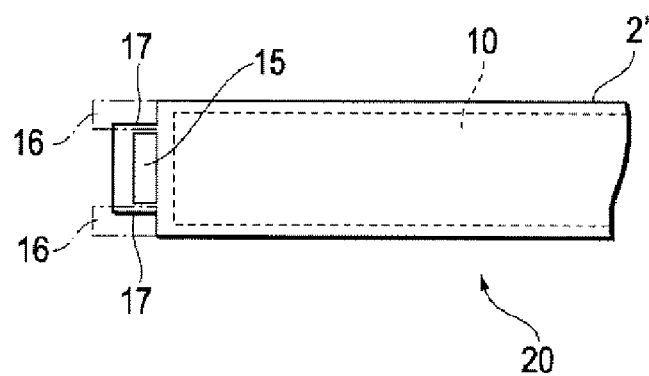
FIG. 4 is a top plan view of a part of a wrist watch used for an EPD module according to a third embodiment.

FIG. 4 is a top plan view of a part of a wrist watch 20 used for an EPD module according to the third embodiment. Unlike the second embodiment, in the third embodiment, in the laminate 2', the conductive portion 15 has two notch portions 17, and the retentive portions 16 retains the notch portions 17 to position the laminate 2' with respect to the case.

As shown in FIG. 4, the two retentive portions 16 contact the notch portions 17 of the conductive portions 15, respectively, to position the laminate 2' with respect to the case that has a curved shape.

Accordingly, in the embodiment, when the flexible laminate 2' is bent and mounted or fixed into the case, a local stress due to electricity of the laminate 2' is applied not to the surface of the EPD unit 10, but to the notch portions 17. Accordingly, display anomaly is prevented, and the reliability of a sealing portion is improved to obtain high display quality and electrical characteristics.

Fourth Embodiment

Figure 5:
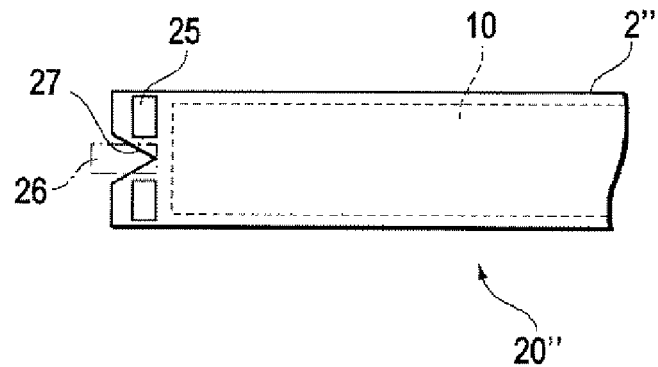
FIG. 5 is a top plan view of a part of a wrist watch used for an EPD module according to a fourth embodiment.

FIG. 5 is a top plan view of a part of a wrist watch 20' used for an EPD module according to the fourth embodiment. Unlike the second embodiment, in the fourth embodiment, in the laminate 2", the conductive portion 25 has a notch portion at the center thereof, and the retentive portion 26 retains the notch portion 27 to position the laminate 2" in the case.

As shown in FIG. 5, the retentive portion 26 contacts the V-shaped notch portion 27 of the conductive portion 25 to position the laminate 2" in the case.

Accordingly, in the embodiment, when the flexible laminate 21' is bent and mounted or fixed into the case, a local stress due to electricity of the laminate 211 is applied not to the surface of the EPD unit 10, but to the notch portions 27. Accordingly, display anomaly is prevented, and the reliability of a sealing portion is improved to obtain high display quality and electrical characteristics.

Even though the EPD module that mounts the flexible laminate in the case is described in the aforementioned embodiments, the invention is not limited to those embodiments. The EPD module may mount a nonflexible laminate.

In addition, even though the EPD module that includes a microcapsule type EPD layer is described in the aforementioned embodiments, the invention is not limited to those embodiments. The EPD module may include a horizontal migration type or vertical migration type EPD layer.

In addition, even though the case where the EPD module is applied to the wrist watch is described in the aforementioned embodiments, the EPD module may be applied to another EPD device.

According to an embodiment of the invention, when the EPD laminate is fixed to the casing, a stress is not applied to the laminate from the retentive portion. Therefore, the reliability of the sealing portion is improved, and the EPD module having high display quality and electrical characteristics and the EPD device that employs the EPD module can be provided.

The entire disclosure of Japanese Patent Application No. 2005-326631, filed Nov. 10, 2005 is expressly incorporated by reference herein.

What is claimed is:

1. An electrophoretic display (EPD) module comprising:
   an EPD laminate including:
   a first substrate having a thin film circuit and a first major surface;
   a second substrate having an electrode and a second major surface opposite the first major surface;
   an EPD layer located between the first substrate and the second substrate; and
   a conductive portion located between the first substrate and the second substrate, the conductive portion being spaced apart from the EPD layer and electrically connecting the thin film circuit and the electrode, the conductive portion having end faces defined by the first and second major surfaces; and
   a casing that encloses the EPD laminate, the casing having a retentive portion that retains the EPD laminate,
   wherein the retentive portion contacts and retains at least a part of the end faces of the conductive portion to position the EPD laminate with respect to the casing.

2. The EPD module according to claim 1, wherein the conductive portion includes notch portions formed by notching the part of the end faces, and the retentive portion contacts and retains the notch portions to position the EPD laminate with respect to the casing.

3. An EPD device that employs the EPD module according to claim 1.

4. The EPD module according to claim 1, wherein the retentive portion retains the part of the end faces in both transverse and longitudinal directions of the EPD laminate.

5. The EPD module according to claim 1, wherein the casing includes a rear frame that includes a cavity, and a display-side frame that is supported within the cavity and includes the retentive portion, and wherein the EPD laminate is positioned between the rear frame and the display-side frame within the cavity.

6. The EPD module according to claim 5, wherein the retentive portion retains the part of the end faces in both transverse and longitudinal directions of the EPD laminate.

* * * * *